United States Patent
Hartung et al.

(10) Patent No.: US 10,451,089 B2
(45) Date of Patent: Oct. 22, 2019

(54) TURBOMACHINE BLADE

(71) Applicant: MTU Aero Engines AG, Munich (DE)

(72) Inventors: Andreas Hartung, Munich (DE); Karl-Hermann Richter, Markt Indersdorf (DE); Herbert Hanrieder, Hohenkammer (DE); Manfred Schill, Munich (DE)

(73) Assignee: MTU Aero Engines AG, Munich (DE)

( * ) Notice: Subject to any disclaimer, the term of this patent is extended or adjusted under 35 U.S.C. 154(b) by 466 days.

(21) Appl. No.: 15/257,434

(22) Filed: Sep. 6, 2016

(65) Prior Publication Data
US 2017/0067487 A1 Mar. 9, 2017

(30) Foreign Application Priority Data

Sep. 7, 2015 (EP) .................................... 15183987

(51) Int. Cl.
*F01D 9/04* (2006.01)
*F04D 29/32* (2006.01)
(Continued)

(52) U.S. Cl.
CPC .............. *F04D 29/668* (2013.01); *F01D 5/16* (2013.01); *F01D 5/26* (2013.01); *F01D 9/041* (2013.01);
(Continued)

(58) Field of Classification Search
CPC .... F04D 29/324; F04D 29/542; F04D 29/668; F01D 5/00; F01D 5/10; F01D 5/12;
(Continued)

(56) References Cited

U.S. PATENT DOCUMENTS 2,349,187 A * 5/1944 Charles ...................... F01D 5/16
188/322.5
2,651,494 A * 9/1953 Persson ................. F01D 5/3053
29/889.21
(Continued)

FOREIGN PATENT DOCUMENTS

DE 102009010185 8/2010
EP 3020922 A1 5/2016
(Continued)

*Primary Examiner* — Justin D Seabe
*Assistant Examiner* — Justin A Pruitt
(74) *Attorney, Agent, or Firm* — Davidson, Davidson & Kappel, LLC

(57) ABSTRACT

A blade for a turbomachine, in particular a compressor or turbine stage of a gas turbine, having at least one matrix having a first impact chamber (10) in which at least one impulse element (11) is disposed with play, at least one second impact chamber (20) whose volumetric centroid is offset from a volumetric centroid of the first impact chamber (10) along a first matrix axis (A) and in which at least one impulse element (21) is disposed with play, and at least one third impact chamber (30) whose volumetric centroid is offset from the volumetric centroid of the first impact chamber (10) along a second matrix axis (B) transversely to the first matrix axis (A) and in which at least one impulse element (31) is disposed with play, the first matrix axis (A) and an axis of rotation (R) of the turbomachine forming an angle of at least 60° and no more than 120° is provided.

20 Claims, 4 Drawing Sheets

(51) Int. Cl.
    *F04D 29/66* (2006.01)
    *F01D 5/16* (2006.01)
    *F01D 25/06* (2006.01)
    *F01D 5/26* (2006.01)
    *F04D 29/54* (2006.01)

(52) U.S. Cl.
    CPC ........... *F01D 25/06* (2013.01); *F04D 29/324* (2013.01); *F04D 29/542* (2013.01); *Y02T 50/671* (2013.01)

(58) Field of Classification Search
    CPC ... F01D 5/16; F01D 5/26; F01D 9/041; F01D 25/04; F01D 25/06
    USPC .......................................................... 416/145
    See application file for complete search history.

(56) References Cited

U.S. PATENT DOCUMENTS

| | | |
|---|---|---|
| 5,232,344 A | 8/1993 | El-Aini |
| 30,280,083 | 10/2013 | Hartung |
| 2016/0138401 A1 | 5/2016 | Hartung et al. |
| 2016/0146041 A1 | 5/2016 | Hartung et al. |

FOREIGN PATENT DOCUMENTS

| | | |
|---|---|---|
| EP | 3023584 A1 | 5/2016 |
| WO | WO2012095067 A1 | 7/2012 |

\* cited by examiner

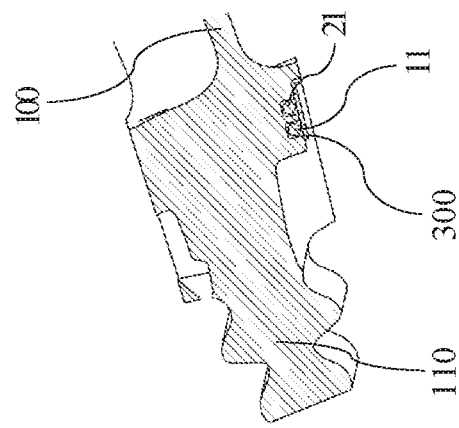
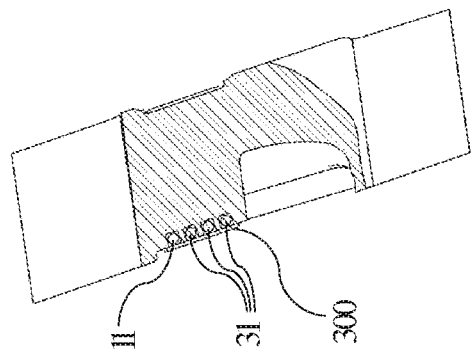

TURBOMACHINE BLADE

This claims the benefit of European Patent Application EP15183987.5, filed Sep. 7, 2015 and hereby incorporated by reference herein.

The work leading to this invention was funded in accordance with Grant Agreement no. CSJU-GAM-SAGE-2008-001 in the course of The European Union's Seventh Framework Program (FP7/2007-2013) for The Clean Sky Joint Technology Initiative.

BACKGROUND

The present invention relates to a blade for a turbomachine, in particular a blade for a gas turbine, a turbomachine, in particular a gas turbine, and a compressor or turbine stage having the blade, as well as to a method for manufacturing the blade.

The Applicant's WO 2012/095067 A1 describes a turbomachine blade having impact or impulse elements which essentially do not reduce blade vibration problems dissipatively by friction, but instead by impact contacts.

In contrast to the heretofore customary dissipative frictional dampers, this approach is based on a novel concept, described in detail in WO 2012/095067 A1, by which vibration modes of the blade are deliberately "mistuned," thereby allowing vibration problems to be reduced.

SUMMARY OF THE INVENTION

It is an object of the present invention to improve a turbomachine.

The present invention provides a blade, in particular a rotor blade, for or of a turbomachine, in particular a compressor or turbine stage of a gas turbine, may in particular be a rotor blade which is disposed on a rotor that is rotatable (rotatably mounted) about a (main) axis of rotation or machine axis of the turbomachine or stage, and which, in particular, is connected to the rotor either detachably, in particular by a friction fit and/or by an interlocking fit, or non-detachably, in particular by a material-to-material bond, a friction fit and/or by an interlocking fit, or is formed integrally therewith. Due to centrifugal force, impulse elements can act here particularly advantageously.

A blade according to the present invention may also be a stator vane fixed relative to the casing of the turbomachine. Surprisingly, impulse elements can advantageously reduce vibration problems here as well.

In an embodiment, the turbomachine is a gas turbine, in particular of an aircraft engine. The blade may be disposed and used, in particular, in a compressor or turbine stage of the gas turbine. Here, impulse elements act particularly advantageously.

In accordance with an aspect of the present invention, the blade has one or more matrices (each) including:
- a first impact chamber in which exactly one or a plurality of impulse elements is disposed with play,
- one or more second impact chambers whose volumetric, respectively geometric centroids are (each) offset or displaced from a volumetric, respectively geometric centroid of the first impact chamber along or (only) longitudinally along a first matrix axis and in (each of) which exactly one or a plurality of impulse elements are disposed with play, and
- one or more third impact chambers whose volumetric, respectively geometric centroids are each) offset or displaced from the volumetric, respectively geometric centroid of the first impact chamber along or (only) longitudinally along a second matrix axis transversely to the first matrix axis and in (each of) which exactly one or a plurality of impulse elements are disposed with play.

Particularly advantageous impact dynamics can be achieved by disposing a single impulse element in an impact chamber.

One or more impulse elements may in particular be at least substantially spherical in shape. This makes it possible to achieve particularly advantageous impact dynamics. In an embodiment, one or more impulse elements may also be at least substantially disk-shaped, in particular cylindrical in shape. This makes it possible, in particular, to define a preferential direction of impact.

In an embodiment, one or more impulse elements each have a mass of at least 0.01 g and/or no more than 0.075 g. This makes it possible to achieve particularly advantageous impact dynamics.

In an embodiment, the play in one or more impact chambers is at least 10 µm, in particular at least 0.05 mm, and in particular at least 0.5 mm, and/or no more than 1.5 mm, in particular no more than 1.2 mm, and in particular more than 0.8 mm, in one or more directions (respectively). This makes it possible to achieve particularly advantageous impact dynamics.

In an embodiment, one or more impact chambers are filled with gas, in particular air, and/or are closed in a gas-tight, in particular air-tight, manner. This makes it possible to achieve particularly advantageous impact dynamics.

In accordance with an aspect of the present invention, (when the blade is in the installed state or mounted in the turbomachine or stage), the first matrix axis and the (main) axis of rotation or machine axis of the turbomachine or stage form an angle of at least 60°, in particular at least 70°, and in particular at least 80°, and no more than 120°, in particular no more than 110°, and in particular no more than 100°.

In other words, in accordance with this aspect, the first, second and third impact chambers of at least one matrix are arranged in a plane formed or defined by the first and second matrix axes; the first matrix axis, along which at least the first and second impact chambers are arranged, being (oriented) approximately, in particular at least substantially, perpendicular to the axis of rotation of the turbomachine or stage when the blade is mounted in the turbomachine.

Surprisingly, it has been found that such an orientation of a matrix of impact chambers makes it possible to achieve particularly advantageous impact dynamics, especially due to centrifugal force in the case of rotor blades, where the first matrix axis is thus aligned or oriented approximately, in particular at least substantially, parallel to the centrifugal force field.

In an embodiment, the second matrix axis and the axis of rotation of the turbomachine or stage form an angle of at least 0° and no more than 30°. In other words, in an embodiment, the plane formed or defined by the first and second matrix axes is (oriented) approximately, in particular at least substantially, parallel to the axis of rotation of the turbomachine or stage when the blade is mounted in the turbomachine.

Surprisingly, it has been found that such an orientation of at least one matrix of impact chambers makes it possible to achieve particularly advantageous impact dynamics, especially due to centrifugal force in the case of rotor blades, where the first matrix axis is thus aligned or oriented approximately, in particular at least substantially, parallel to the centrifugal force field.

In an embodiment, the first and second matrix axes form an angle of at least 30°, in particular at least 60°, more particularly at least 80°, and no more than 90°.

It has been found that such an arrangement of the impact chambers within the matrix makes it possible to achieve particularly advantageous impact dynamics.

In an embodiment, at least one of the matrices has one or more fourth impact chambers in (each of) which exactly one or a plurality of impulse elements is disposed with play and whose volumetric, respectively geometric centroids are (each) spaced from a plane formed by the first and second matrix axes by at least 75%, in particular at least 50%, in particular no more than 25%, of a maximum extent of the (respective) fourth impact chamber, in particular of the (largest) impulse element disposed therein. In other words, in this embodiment, the matrix has more than three impact chambers, all of which are approximately, in particular at least substantially, arranged in a plane (formed by the first and second matrix axes).

Particularly advantageous impact dynamics can be achieved by arranging additional impact chambers approximately, in particular at least substantially, in the matrix plane.

In an embodiment, in the case of one or more, in particular all, fourth impact chambers of at least one matrix, a first connecting line between the volumetric centroid of the (respective) fourth impact chamber and the volumetric centroid of another one of the impact chambers, in particular of a third or another fourth impact chamber, forms an angle of at least 10° with the first matrix axis, and a second connecting line between the volumetric centroid of this fourth impact chamber and the volumetric centroid of another one of the impact chambers, in particular of a second or another fourth impact chamber, forms an angle of at least 10° with the second matrix axis. In other words, in an embodiment, the matrix or arrangement of the impact chambers may be in an approximately, in particular at least substantially, checkerboard-like pattern.

It has been found that such an arrangement of the impact chambers within the matrix makes it possible to achieve particularly advantageous impact dynamics.

In an embodiment, the volumetric centroids of one or more, in particular all, pairs of impact chambers are (respectively) spaced apart by at least 110%, in particular at least 150%, and/or no more than 400%, in particular no more than 200%, of a maximum extent of the impulse elements of the two impact chambers. If the impulse elements of the two impact chambers of a pair have different maximum extents, then, in accordance with the present invention, the maximum extent of the impulse elements of the two impact chambers is the largest one of these maximum extents; in the case of equal maximum extents, the maximum extent is this (identical) maximum extent.

If, for example, two identical cylindrical impact chambers having a radius R and a height H>2R each contain a single spherical impulse element having a radius r<R, then, in an embodiment, the volumetric centroids of the two impact chambers are spaced apart by at least 2.2r and/or no more than 8r.

It has been found that such a spacing of impact chambers within the matrix makes it possible to achieve particularly advantageous impact dynamics.

In an embodiment, at least one of the matrices described here is arranged on a side of a blade shroud that faces away from the airfoil, in particular of a shroud located at the root end of the blade (airfoil); i.e., an inner shroud, or of a shroud located at the tip end of the blade (airfoil); i.e., an outer shroud.

By arrangement below an inner shroud, it is advantageously possible to use the space available there, and to particularly effectively mistune certain vibration modes or frequencies which, in particular, are frequently excited during operation.

In an embodiment, the blade has a base member, in particular a blade root, formed with or connected to an airfoil.

In an embodiment, the airfoil is intended or adapted to deflect a flow of working fluid of the turbomachine or stage and, in an embodiment, has an, in particular convex, suction side, and an, in particular concave, pressure side, for this purpose.

In an embodiment, the airfoil is, in particular integrally, formed with the base member, in particular by primary shaping, or connected to the base member, in particular by a material-to-material bond, a friction fit and/or by an interlocking fit, in particular by welding.

In an embodiment, at least 75% of the impact chambers, in particular all impact chambers, of at least one matrix are arranged in or on a suction-side half of the blade. This advantageously makes it possible to reduce in particular exit flow-excited vibrations.

In an embodiment, additionally or alternatively, at least 75% of the impact chambers, in particular all impact chambers, of at least one matrix are arranged in or on a pressure-side half of the blade. This advantageously makes it possible to reduce in particular incident flow-excited vibrations.

In an embodiment, one or more, in particular all, impact chambers of at least one matrix are formed in or by the base member of the blade, in particular produced therein by primary shaping or machining. This makes it possible to achieve a particularly compact configuration.

In an embodiment, additionally or alternatively, one or more, in particular all, impact chambers of at least one matrix are formed in a housing, in particular produced by primary shaping or machining, the housing being manufactured separately from the base member and connected thereto, in particular by a material-to-material bond, in particular by welding. This makes it possible to achieve particularly advantageous impact dynamics.

In an embodiment, one or more, in particular all, impact chambers of at least one matrix are closed by a cover after insertion of the impulse elements, the cover being connected, in particular, by a material-to-material bond, in particular by welding. For this purpose, the cover and/or the separate housing may advantageously be made from a nickel-chromium-molybdenum alloy, in particular Haynes 230 or HastelloyX. In an embodiment, this advantageously makes it possible to reduce the influence of the working fluid of the turbomachine on the impact dynamics.

In accordance with an aspect of the present invention, in order to manufacture a blade as described herein, the impact chambers are formed, the impulse elements are introduced, and the impact chambers are sealed. In a refinement, initially, the impact chambers formed in the housing are closed by the cover, and then the housing is connected to the base member. This advantageously makes it possible to test the impact dynamics in advance.

BRIEF DESCRIPTION OF THE DRAWINGS

Further advantageous refinements of the present invention will be apparent from the dependent claims and the following description of preferred embodiments. To this end, the drawings show, partly in schematic form, in:

FIG. 8: a cross section, corresponding to FIGS. 3, 6, of a blade of a compressor or turbine stage of a gas turbine according to another embodiment of the present invention; and FIG. 9: a cross section, corresponding to FIGS. 4, 7, of the blade of FIG. 8.

DETAILED DESCRIPTION

Figure 1:
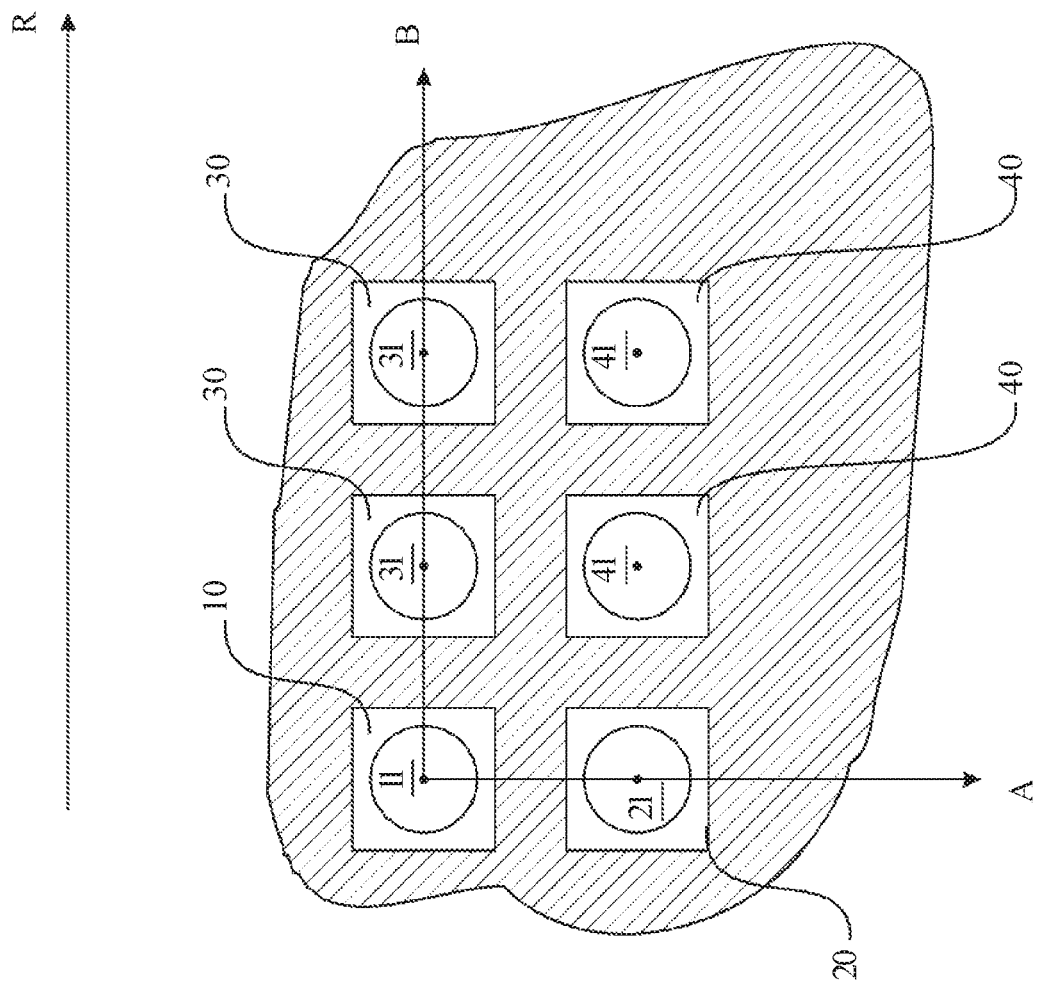
FIG. 1: a matrix of a blade of a compressor or turbine stage of a gas turbine according to an embodiment of the present invention.

FIG. 1 shows, in partially schematic form, a matrix of a blade of a compressor or turbine stage of a gas turbine according to an embodiment of the present invention.

The matrix has a first impact chamber 10 in which a spherical impulse element 11 is disposed with play, a second impact chamber 20 whose volumetric, respectively geometric centroid is offset from the volumetric, respectively geometric centroid of first impact chamber 10 along a first matrix axis A and in which a spherical impulse element 21 is disposed with play, and two third impact chambers 30 whose volumetric, respectively geometric centroids are each offset from the volumetric, respectively geometric centroid of first impact chamber 10 along a second matrix axis B transversely to first matrix axis A and in each of which a spherical impulse element 31 is disposed with play. The volumetric, respectively geometric centroids are indicated by filled circles, respectively.

In the installed state; i.e., when mounted in the stage, first matrix axis A and (main) axis of rotation or machine axis R of the stage form an angle of approximately 90°.

In the exemplary embodiment, second matrix axis B and axis of rotation R of the stage form an angle of approximately 0°.

First and second matrix axes A, B form an angle of approximately 90°.

The matrix has, by way of example, two fourth impact chambers 40 in each of which a spherical impulse element 41 is disposed with play and whose volumetric, respectively geometric centroids each lie in the plane formed by first and second matrix axes A, B; i.e., in the plane of the drawing of FIG. 1.

In the case of fourth impact chambers 40, a first connecting line between the volumetric centroid of the respective fourth impact chamber 40 and the volumetric centroid of one of the third impact chambers 30 (vertical in FIG. 1) forms an angle of approximately 0° with first matrix axis A, and a second connecting line between the volumetric centroid of this fourth impact chamber and the volumetric centroid of second impact chamber 20 (horizontal in FIG. 1) forms an angle of approximately 0° with second matrix axis B, so that impact chambers 10, 20, 30 and 40 are arranged in a checkerboard-like pattern.

The volumetric centroids of all pairs of impact chambers 10, 20, 30 and 40 are respectively spaced apart by at least 110% and no more than 400% of the diameter of the identical impulse elements 11, 21, 31 and 41.

Figure 2:
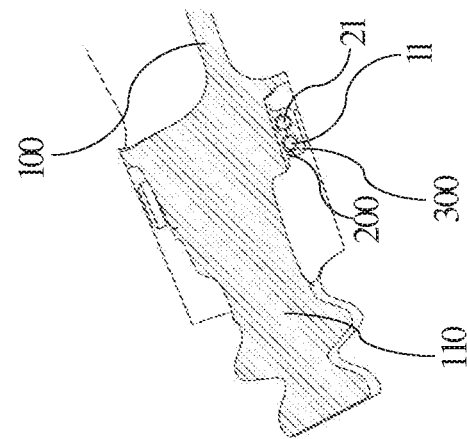
FIG. 2: a perspective view of a portion of a blade of a compressor or turbine stage of a gas turbine according to an embodiment of the present invention.
Figure 3:
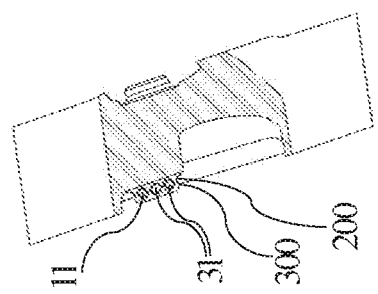
FIG. 3: a cross section taken along line III—III in FIG. 2.
Figure 4:
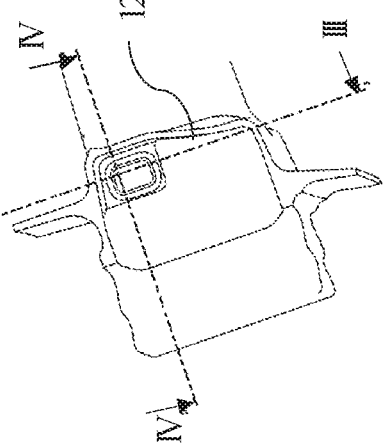
FIG. 4: a cross section taken along line IV—IV in FIG. 2.

FIGS. 2-4 show a portion of a blade of a compressor or turbine stage of a gas turbine according to an embodiment of the present invention in a perspective view (FIG. 2) and cross sectional views taken along lines III-III (FIG. 3) and IV-IV (FIG. 4). Features corresponding to the embodiment of FIG. 1 are denoted by the same reference numerals, so that reference is made to the description thereof.

Section line IV-IV corresponds to first matrix axis A, which is perpendicular to the axis of rotation, while section line III-III corresponds to second matrix axis B, which forms an angle of approximately 20° with the axis of rotation.

The blade has a blade root 110 formed with an airfoil 100.

The matrix is arranged on a side that faces away from the airfoil (left in FIG. 2) of a blade shroud located at the root end of the airfoil; i.e., an inner shroud 120.

The impact chambers are formed in a housing 200, in particular produced by primary shaping or machining, the housing being manufactured separately from blade root 110 and connected thereto by welding. Prior to this, the housing is closed by a cover 300.

In the embodiment of FIGS. 2-4, the impact chambers of the matrix are arranged in or on a pressure-side half of the blade (at the top in FIG. 2).

Figure 5:
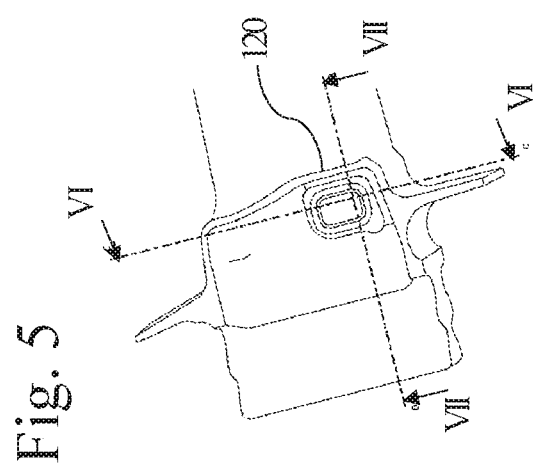
FIG. 5: a perspective view of a portion of a blade of a compressor or turbine stage of a gas turbine according to another embodiment of the present invention.
Figure 6:
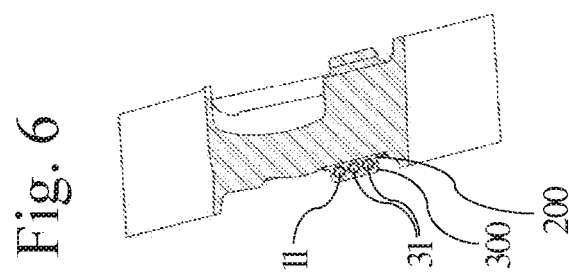
FIG. 6: a cross section taken along line VI—VI in FIG. 5.
Figure 7:
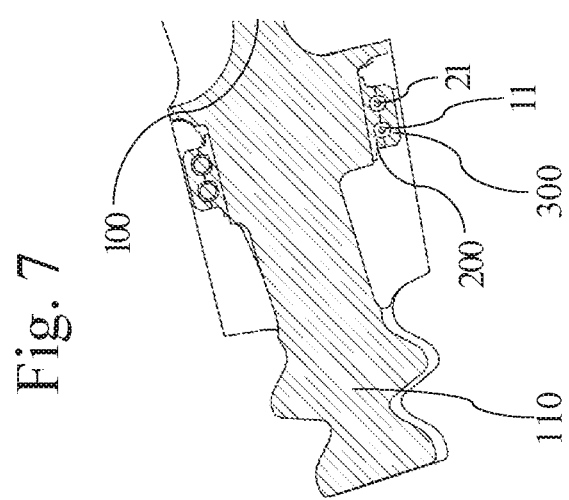
FIG. 7: a cross section taken along line VII—VII in FIG. 5.

FIGS. 5-7 show, similarly to FIGS. 2-4, a portion of a blade of a compressor or turbine stage of a gas turbine according to another embodiment of the present invention in a perspective view (FIG. 5) and cross sectional views taken along lines VI-VI (FIG. 6) and VII-VII (FIG. 7). Again, features corresponding to the embodiments of FIGS. 1-4 are denoted by the same reference numerals, so that reference is made to the description thereof and only the differences will be discussed below.

In the embodiment of FIGS. 5-7, the impact chambers of the matrix are arranged in or on a suction-side half of the blade (at the bottom in FIG. 5).

FIGS. 8, 9 are cross sections, corresponding to FIGS. 3, 4, respectively 6, 7, showing a portion of a blade of a compressor or turbine stage of a gas turbine according to another embodiment of the present invention. Again, features corresponding to the embodiments of FIGS. 1-7 are denoted by the same reference numerals, so that reference is made to the description thereof and only the differences will be discussed below.

In the embodiment of FIGS. 8, 9, the impact chambers are formed in blade root 110 of the blade, in particular produced therein by primary shaping or machining. In addition, three third impact chambers, respectively impulse elements, are provided here by way of example.

Although not discernible in FIGS. 2-9, here too, fourth impact chambers having impulse elements are provided similar to the embodiment of FIG. 1, the impact chambers being arranged in a checkerboard-like pattern in the plane of the matrix.

Although the above is a description of exemplary embodiments, it should be noted that many modifications are possible. It should also be appreciated that the exemplary embodiments are only examples, and are not intended to limit the scope, applicability, or configuration in any way. Rather, the foregoing detailed description provides those skilled in the art with a convenient road map for implementing at least one exemplary embodiment, it being understood that various changes may be made in the function and arrangement of elements described without departing from the scope of protection set forth in the appended claims and their equivalent combinations of features.

LIST OF REFERENCE NUMERALS 10 first impact chamber
11 impulse element
20 second impact chamber
21 impulse element
30 third impact chamber
31 impulse element
40 fourth impact chamber
41 impulse element
100 airfoil
110 blade root
120 inner shroud
200 housing
300 cover
A first matrix axis
B second matrix axis
R axis of rotation

What is claimed is:

1. A blade for a turbomachine, in particular a compressor or turbine stage of a gas turbine, comprising at least one matrix having:
    a first impact chamber, at least one impulse element disposed with play in the first impact chamber;
    at least one second impact chamber whose volumetric centroid is offset from a volumetric centroid of the first impact chamber along a first matrix axis, at least one second impulse element disposed with play in the second impact chamber, and
    at least one third impact chamber whose volumetric centroid is offset from the volumetric centroid of the first impact chamber along a second matrix axis transversely to the first matrix axis, at least one third impulse element disposed with play in the third impact chamber,
    the first matrix axis and an axis of rotation of the turbomachine forming an angle of at least 60° and no more than 120°;
    the first, second and third impact chambers all being located either on a suction-side of the blade, or all being located on a pressure-side of the blade.

2. The blade as recited in claim 1 wherein the second matrix axis forms an angle of at least 0° and no more than 30° with the axis of rotation of the turbomachine.

3. The blade as recited in claim 1 further comprising at least one fourth impact chamber whose volumetric centroid is in a plane formed by the first and second matrix axes, at least one fourth impulse element disposed with play in the fourth impact chamber.

4. The blade as recited in claim 3 wherein a first connecting line between the volumetric centroid of the fourth impact chamber and the volumetric centroid of another one of the first impact chamber, the second impact chamber and the third impact chamber forms an angle of no more than 0° with the first matrix axis, and a second connecting line between the volumetric centroid of the fourth impact chamber and the volumetric centroid of the other one of the impact chamber, the second impact chamber and the third impact chamber forms an angle of no more than 10° with the second matrix axis.

5. The blade as recited in claim 1 wherein the volumetric centroids of at least one pair of the first impact chamber, the second impact chamber and the third impact chamber are spaced apart by at least 110% or no more than 400% of a maximum length dimension of the respective two of the impulse element, the second impulse element and the third impulse elements of the pair.

6. The blade as recited in claim 1 wherein the matrix is arranged on a side of a shroud of the blade facing away from the airfoil.

7. The blade as recited in claim 1 wherein at least one of the first impact chamber, the at least one second impact chamber and the at least one third impact chamber is formed in a base member formed with or connected to an airfoil.

8. The blade as recited in claim 1 wherein at least one of the first impact chamber, the at least one second impact chamber and the at least one third impact chamber is formed in a housing connected to a base member formed with or connected to an airfoil.

9. The blade as recited in claim 8 wherein the housing is connected by a material-to-material bond to the base member.

10. The blade as recited in claim 1 wherein at least one of the first impact chamber, the at least one second impact chamber and the at least one third impact chamber is closed by a cover.

11. The blade as recited in claim 10 wherein the cover is connected by a material-to-material bond.

12. A compressor or turbine stage for a gas turbine comprising at least one blade as recited in claim 1.

13. A turbomachine comprising at least one blade as recited in claim 1.

14. A gas turbine comprising the turbomachine as recited in claim 13.

15. A method for manufacturing a blade as recited in claim 1 comprising the steps of: forming the first impact chamber, the second impact chamber and the third impact chamber; introducing the impulse element, the second impulse element and the third impulse element; and closing the first impact chamber, the second impact chamber and the third impact chamber.

16. The blade as recited in claim 1 wherein the first, second and third impact chambers all are located on the suction-side of the blade.

17. The blade as recited in claim 1 wherein the first, second and third impact chambers all are located on the pressure-side of the blade.

18. The blade as recited in claim 1 wherein at least one of the at least one impulse element, the at least one second impulse element and the at least one third impulse elements has a mass of at least 0.01 g and no more than 0.075 grams.

19. The blade as recited in claim 1 wherein play in at least one of the first, second and third impact chambers in at least one direction is at least 10 micrometers and no more than 1.5 mm.

20. The blade as recited in claim 1 wherein the second matrix axis forms an angle of at least 30° and no more than 90° with the first matrix axis.

* * * * *